US011635773B2

(12) United States Patent
Anishchenko et al.

(10) Patent No.: US 11,635,773 B2
(45) Date of Patent: Apr. 25, 2023

(54) TILT-FRAME UAV FOR AGRICULTURAL AIR SAMPLING WITH A PROPELLER-THRUST-GOVERNING SYSTEM THAT FACILITATES VTOL CAPABILITY

(71) Applicant: The Regents of the University of California, Oakland, CA (US)

(72) Inventors: Ilya M. Anishchenko, Davis, CA (US); Stephen K. Robinson, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 642 days.

(21) Appl. No.: 16/495,049

(22) PCT Filed: May 15, 2018

(86) PCT No.: PCT/US2018/032778
§ 371 (c)(1),
(2) Date: Sep. 17, 2019

(87) PCT Pub. No.: WO2018/222388
PCT Pub. Date: Dec. 6, 2018

(65) Prior Publication Data

US 2020/0285251 A1 Sep. 10, 2020

Related U.S. Application Data

(60) Provisional application No. 62/512,928, filed on May 31, 2017.

(51) Int. Cl.
*G05D 1/10* (2006.01)
*B64C 25/04* (2006.01)
(Continued)

(52) U.S. Cl.
CPC ............ *G05D 1/102* (2013.01); *B64C 9/323* (2013.01); *B64C 25/04* (2013.01);
(Continued)

(58) Field of Classification Search
CPC .... B64C 9/06; B64C 9/04; B64C 9/30; B64C 9/32; B64C 9/34; B64C 25/04;
(Continued)

(56) References Cited

U.S. PATENT DOCUMENTS 3,454,238 A * 7/1969 Goodson ............ B64C 29/0025 244/12.3
4,071,207 A * 1/1978 Piasecki ............ B64C 29/0025 244/221
(Continued)

OTHER PUBLICATIONS

International Search Report and Written Opinion of the Korean Patent Office for PCT Patent Application No. PCT/US2018/032778 dated Aug. 28, 2018.

*Primary Examiner* — Richard Green
*Assistant Examiner* — Madison Elizabeth Dittner
(74) *Attorney, Agent, or Firm* — Park, Vaughan, Fleming & Dowler LLP

(57) ABSTRACT

We describe an aircraft design, which is capable of vertical takeoff and landing and also high-speed cruise on a fixed wing. The aircraft comprises a fuselage with a probe-deployment mechanism, which deploys a sample-gathering probe, located at a front end of the fuselage. A main wing is coupled to a middle section of the fuselage, wherein a right motor and right propeller are coupled to a right side of the main wing, and a left motor and left propeller are coupled to a left side of the main wing. The right and left propellers are angled with respect to the fuselage enabling the aircraft to pitch up to a vertical-takeoff mode and pitch down a horizontal-cruising mode. A pitch motor and pitch propeller are located at the rear end of the fuselage, wherein the pitch
(Continued)

propeller is angled to provide substantially vertical thrust to control a pitch of the fuselage.

12 Claims, 7 Drawing Sheets

(51) Int. Cl.

| | |
|---|---|
| ***B64C 39/02*** | (2023.01) |
| ***B64C 9/32*** | (2006.01) |
| ***B64C 29/00*** | (2006.01) |
| ***B64U 10/25*** | (2023.01) |
| ***B64U 30/10*** | (2023.01) |
| ***B64U 30/20*** | (2023.01) |
| ***B64U 50/19*** | (2023.01) |
| ***B64U 101/00*** | (2023.01) |
| ***G01N 1/24*** | (2006.01) |
| ***G05D 1/00*** | (2006.01) |

(52) U.S. Cl.

CPC ........ *B64C 29/0025* (2013.01); *B64C 39/024* (2013.01); *G01N 1/24* (2013.01); *G05D 1/0094* (2013.01); *B64U 10/25* (2023.01); *B64U 30/10* (2023.01); *B64U 30/20* (2023.01); *B64U 50/19* (2023.01); *B64U 2101/00* (2023.01)

(58) Field of Classification Search

CPC ....... B64C 29/0025; B64C 9/38; B64C 9/323; B64C 15/14

See application file for complete search history.

(56) References Cited

U.S. PATENT DOCUMENTS

| | | | | |
|---|---|---|---|---|
| 5,454,531 | A * | 10/1995 | Melkuti .............. | B64C 29/0025 244/12.6 |
| 7,374,130 | B2 * | 5/2008 | Atmur .................... | B64D 31/12 244/51 |
| 10,526,633 | B2 * | 1/2020 | Ramasamy ........ | G01N 33/0098 |
| 2006/0186261 | A1 | 8/2006 | Unzicker | |
| 2013/0026302 | A1 | 1/2013 | Lee et al. | |
| 2014/0339372 | A1 | 11/2014 | Dekel et al. | |
| 2015/0274294 | A1 * | 10/2015 | Dahlstrom ............ | E04G 23/002 239/722 |
| 2015/0336663 | A1 * | 11/2015 | Paduano ................. | B64C 29/00 244/12.4 |
| 2016/0001878 | A1 | 1/2016 | Lee | |
| 2016/0236775 | A1 * | 8/2016 | Eshkenazy .......... | B64C 29/0025 |
| 2016/0272315 | A1 | 9/2016 | Logan et al. | |
| 2018/0335372 | A1 * | 11/2018 | Orol ......................... | G01N 1/08 |
| 2018/0346112 | A1 * | 12/2018 | Chiang ............... | B64C 29/0033 |
| 2019/0337614 | A1 * | 11/2019 | Villa ......................... | B64C 9/38 |

* cited by examiner

| Agricultural UAS Characteristics | |
|---|---|
| Wingspan (total) | 1.12$m$ |
| Fuselage length | 1.41$m$ |
| Wingspan (effective) | 0.800$m$ |
| Wing area | 0.128$m^2$ |
| Wing thickness | 0.010$m$ |
| Mean chord length | 0.160$m$ |
| Aspect Ratio | 5 |
| UAS mass (w/o payload) | 2.70$kg$ |
| Power source (battery) | 14.8V 8000mAh |
| Front propellers | 13x4 |
| Rear propeller | 7x4 |
| Frontal area (estimated) | 0.0116$m^2$ |
| Fuselage diameter | 0.0768$m$ |
| Wing loading (max) | 21.1$kg/m^2$ |
| Front motors | NTM 35-42 700W |
| Rear motor | NTM 28-26A 286W |
| PTGS servo motors | D-MG16 0.284$N-m$, 750°/$s$ |

FIG. 5

TILT-FRAME UAV FOR AGRICULTURAL AIR SAMPLING WITH A PROPELLER-THRUST-GOVERNING SYSTEM THAT FACILITATES VTOL CAPABILITY

RELATED APPLICATION

This application claims priority under 35 U.S.C. § 119 to U.S. Provisional Application No. 62/512,928, entitled "Aerial Vehicle with Propeller-Thrust-Governing System that Provides VTOL Capability and Facilitates Maximum Reach Probe Deployment" by the same inventors as the instant application, filed on 31 May 2017, the contents of which are incorporated herein by reference.

BACKGROUND

Field

The disclosed embodiments generally relate to the design of aerial vehicles with vertical take-off and landing (VTOL) capability, and which can also achieve high-speed cruising flight on fixed wings. More specifically, the disclosed embodiments relate to an unmanned aerial vehicle (UAV), which is designed for sampling agricultural volatile organic compounds (VOCs) with a thrust-governing system that facilitates both VTOL capability and control of level flight sustained by rigid-wing lift.

Related Art

Due to their low operating costs, UAVs are becoming increasingly popular for agricultural applications. Moreover, UAV avionics are growing smaller in size and weight while improving performance. This makes it easier to install high-definition video, infrared-imaging, and thermal cameras onboard UAVs for remote sensing missions. UAVs have been successfully used in agriculture to collect data for Normalized Difference Vegetation Index (NDVI) computations and to produce thermal imagery for quantifying intra-field vegetation distribution. Lidars are also becoming readily available in small packages and can be used to create three-dimensional maps for forest density studies. (Note that the terms UAS and UAV are used interchangeably throughout this specification and the appended claims.)

The remote sensing applications for UAVs in agriculture are already numerous and are enjoying sustained growth. The most common UAV sensors for agricultural use are cameras, with a variety of spectral capabilities. Fixed-wing agricultural UAVs are often employed to gather imagery over larger and/or more-remote fields because of their long range and endurance. In contrast, multirotor UAVs are appropriate for flight over smaller fields at lower altitudes because of their slower speeds, hover capabilities, and limited endurance.

There are additional sensors, which are possible to use for collecting agricultural information in the field. For example, it can be economically valuable to be able to collect samples of Volatile Organic Compounds (VOCs) dispersed in the air to assess the health of specific types of crops. However, in order to collect such VOC samples, a UAV must fly low and slow, or land within the crops. Unlike aerial imagery, VOC collection is not instantaneous—a significant volume of air must be sampled to obtain measureable concentrations of VOCs, so flying while sampling significantly reduces sampling accuracy. Moreover, landing safely within a producing field or orchard is impossible for a fixed wing UAV and can be only achieved by an aircraft with VTOL capability. Due to the limited endurance and range of multirotor UAVs, landings can only be conducted across small fields. However, this limited range defeats the purpose of using a UAV instead of a handheld device for performing VOC sampling. Note that it is impractical to use limited-range multirotors to perform VOC sampling across large fields, because the power source (usually a battery) would have to be changed repeatedly to a multirotor to traverse the large fields. Therefore, neither traditionally-deigned multirotor UAVs nor fixed-wing UAVs are well-suited to agricultural VOC sampling demands.

A tiltrotor UAV design can potentially provide a practical alternative to fixed-wing and multirotor UAV designs for VOC sampling applications. A tiltrotor is a multirotor/fixed-wing hybrid, which is capable of VTOL and relies on wings during a cruising mode. Tiltrotors typically have a propulsion system that turns 90 degrees to switch between horizontal and vertical positions with respect to the aircraft. During take-off, the tiltrotor orients its engines vertically. After gaining altitude, the engines pitch forward to transition to a horizontal position for a cruising mode. During this transition, the aircraft picks up speed and transfers lift from the engines to the wings. During landing, the process is reversed. Note that a tiltrotor's VTOL capability allows it to land like a multirotor and save energy while collecting VOCs. The tiltrotor also provides a cruising range similar to a fixed wing aircraft, which is considerably higher than cruise ranges for traditional multirotor UAV's.

In theory, these characteristics should enable a tiltrotor to efficiently monitor VOCs in much larger fields. However, this is not always the case. The tilting mechanism is complex and adds significant weight. Hence, tiltrotors tend to be heavier than size-equivalent multirotor or fixed-wing aircraft. Moreover, the aerodynamic performance of tiltrotors is usually worse than fixed-wing aircraft due to variable geometries.

Hence, what is needed is a new conceptual design for tiltrotor UAVs for agricultural atmospheric sampling applications—one which does not suffer from the above-described performance limitations of existing tiltrotor systems.

SUMMARY

The disclosed embodiments relate to an aircraft design, which is capable of vertical takeoff and landing and also high-speed cruise on a fixed wing. This aircraft includes a fuselage, and a probe-deployment mechanism located at a front end of the fuselage, wherein the probe-deployment mechanism is configured to deploy a sample-gathering probe. It also includes a main wing coupled to a middle section of the fuselage, wherein a right motor and associated right propeller are coupled to a right side of the main wing, and a left motor and associated left propeller are coupled to a left side of the main wing. The right and left propellers are angled with respect to the fuselage to provide thrust-generation lines, which are similarly angled with respect to the fuselage, which enables the aircraft to pitch up to a vertical-takeoff mode and pitch down a horizontal-cruising mode. The aircraft also includes a pitch motor and associated pitch propeller located at the rear end of the fuselage, wherein the pitch propeller is angled to provide substantially vertical thrust to control a pitch of the fuselage. When the aircraft is pitched up, the front end of the fuselage sits higher than a rear end of the fuselage to allow the probe-deployment mechanism to extend higher.

In some embodiments, the probe-deployment mechanism includes an extendable boom, which extends the sample-gathering probe away from the aircraft.

In some embodiments, the sample-gathering probe is configured to sample volatile organic compounds (VOCs).

In some embodiments, the aircraft further comprises one or more landing supports, which support the aircraft after a vertical landing so that the front end of the fuselage sits higher than the rear end of the fuselage, which facilitates extending the sample-gathering probe above and away from the aircraft.

In some embodiments, the one or more landing supports comprise the following three landing supports: a right leg extending from the middle section of the fuselage; a left leg extending from the middle section of the fuselage; and a tail support extending from the rear end of the fuselage.

In some embodiments, the aircraft further comprises: a right Propeller-Thrust-Governing System (PTGS) located in proximity to the right propeller; and a left PTGS located in proximity to the left propeller. During operation of the aircraft, the right and left PTGS s are adjustable to reduce and/or redirect thrust from the associated right and left propellers.

In some embodiments, by reducing and/or redirecting thrust from the left and right propellers, the left and right PTGSs control a roll-axis rotation and a yaw-axis rotation for the aircraft.

In some embodiments, each PTGS comprises a pair of adjustable butterfly flaps located in an airflow of an associated propeller.

In some embodiments, each pair of butterfly flaps includes: a front-facing flap, which faces a front of the aircraft; and a rear-facing flap, which faces a rear of the aircraft.

In some embodiments, the left motor, the right motor and the pitch motor comprise a tri-motor system, wherein the left and right motors are primarily responsible for generating thrust and controlling roll-axis and yaw-axis rotations for the aircraft, and wherein the pitch motor is primarily responsible for controlling a pitch-axis rotation for the aircraft.

In some embodiments, the right and left propellers are fixedly attached to the main wing so that the angles of the right and left propellers cannot change with respect to the fuselage.

In some embodiments, the pitch motor comprises a variable-speed motor.

In some embodiments, the aircraft comprises an unmanned aerial vehicle (UAV).

The disclosed embodiments also relate to a propeller-thrust-governing system (PTGS) for an associated propeller. This PTGS includes one or more control surfaces located in an airflow of the associated propeller, wherein the one or more control surfaces are adjustable to reduce a thrust produced by the associated propeller, and wherein the one or more control surfaces are also adjustable to redirect the thrust produced by the associated propeller.

In some embodiments, the PTGS and the associated propeller are components of an aircraft. By reducing and/or redirecting the thrust produced by the associated propeller, the PTGS facilitates controlling one or more of the following for the aircraft: a roll-axis rotation; a yaw-axis rotation; a pitch-axis rotation for the aircraft; and a level of propulsion.

In some embodiments, the one or more control surfaces comprise a pair of adjustable butterfly flaps located in the airflow of the associated propeller.

In some embodiments, each flap in the pair of adjustable butterfly flaps is independently controllable.

In some embodiments, the pair of adjustable butterfly flaps includes a standard flap in a standard orientation, wherein a hinged leading edge of the flap is closer to the associated propeller than a trailing edge of the flap. It also includes an inverted flap in an inverted orientation, wherein the trailing edge of the flap is closer to the associated propeller than the hinged leading edge of the flap.

The disclosed embodiments also relate to a system for gathering volatile organic compound (VOC) samples from a tree in an orchard. During operation, the system vertically lands an unmanned aerial system (UAS), which is capable of vertical take-off and landing (VTOL), in proximity to the tree in the orchard. Next, the system shuts down a propulsion system for the UAS, and extends a VOC sensor from the UAS toward a canopy of the tree. The system then collects a VOC sample by activating the VOC sensor for a predetermined amount of time. After the sampling is complete, the system retracts the VOC sensor back to the UAS and restarts the propulsion system for the UAS. Finally, the system performs a vertical takeoff with the UAS, and flies the UAS back to a base or another sampling location.

BRIEF DESCRIPTION OF THE FIGURES

FIG. 5 provides a list of agricultural UAS design characteristics in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. The methods and processes described in the detailed description section can be embodied as code and/or data, which can be stored in a computer-readable storage medium as described above.

Mission

Figure 3:
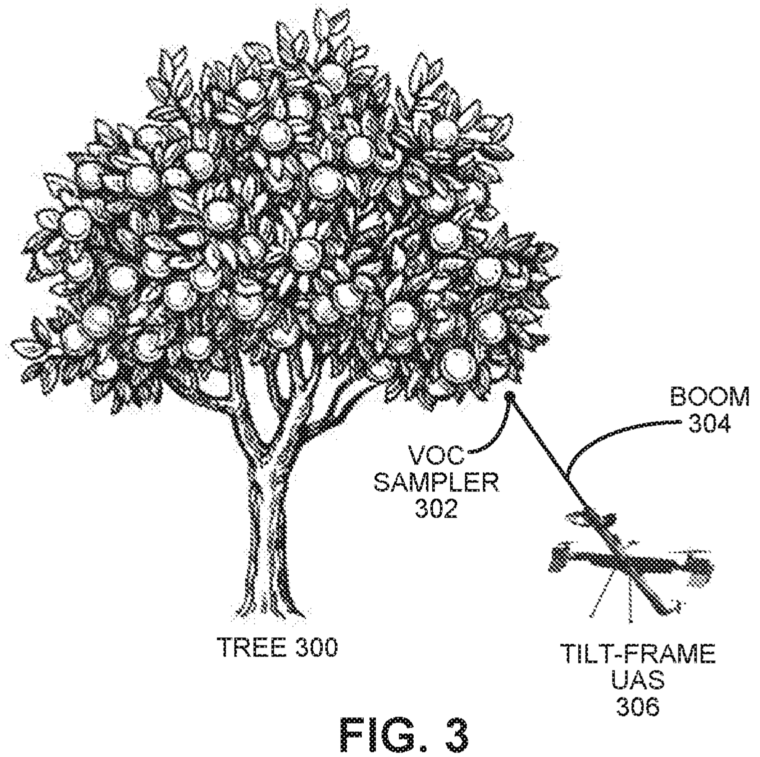
FIG. 3 illustrates a tilt-frame UAS, which has landed in proximity to a tree, in accordance with the disclosed embodiments.

Instead of starting with a generic multirotor platform and tailoring it to an agricultural mission, the agricultural UAS was designed from the ground up for a specific agricultural mission. In particular, the UAS is equipped with a VOC sampler capable of collecting and/or analyzing air samples. During operation, the UAS is designed to land in a citrus orchard between rows of trees and power down its rotors. The UAS then proceeds to extend a sampling tube, which is mounted on an extendable boom, towards a targeted tree's canopy. See FIG. 3, which illustrates UAS 306, which has landed in proximity to a tree 300 and has deployed a boom 304 with a VOC sampler 302 towards the canopy of tree 300. By using an air pump, air in vicinity to tree 300 is drawn through the sampling tube for a predetermined amount of time. Once a sample of sufficient volume is collected, the UAS 306 retracts boom 300 and performs a vertical take-off to gain enough altitude to clear the tree canopy. The UAS 306 then transitions to a horizontal flight mode and cruises to the next targeted tree. After completing a sequence of targeted stops, the UAS 306 returns to its original point of deployment.

Design Parameters

The design of the agricultural UAS is mission driven. This mission can be defined as the delivery of a sensor to an orchard for VOC sampling. The weight and size of the payload dictates the weight and size of the UAS. The payload size has not been precisely established, but a rough estimate for the payload mass (0.3 kg) was used as a starting point. Knowing this payload mass, a rough estimate for the expected aircraft weight can be calculated using acceptable load fractions. For a propeller-driven VTOL aircraft, the load fraction is commonly between 25%-35% of the aircraft weight. (See M. Gatti and F. Giulietti, "Preliminary design analysis methodology for electric multirotor," IFAC, 2013.) Given that the design calls for a long range/endurance aircraft with a lithium-ion battery power source, this load fraction should be reduced because of the relatively low energy density of batteries. A load fraction of 10%-15% was chosen because it is better suited for completing a mission with the desired range/endurance characteristics.

With the given load fraction, the estimated UAS mass is calculated to be between 3 kg and 2 kg. To achieve VTOL, the thrust generated by the motors must be capable of exceeding the weight of the aircraft. Thus, the motors collectively must be capable of producing 20 to 30 Newtons of thrust. Note that the thrust generated by the motors is dependent on many factors. Hence, thrust alone cannot be used to size motors. Motors are typically sized based on the amount of power they are able to safely handle. Most electric, battery-powered multirotors have a minimum power to weight ratio of □165 W/kg for hovering operations. (See D. Bershadsky and S. Haviland, "Electric multirotor propulsion system sizing for performance prediction and design optimization," AIAA SciTech Forum, 2016.) Using this estimated value, the power required for the agricultural UAS is between 330 watts and 500 watts for take-off and landing operations.

The design for the agricultural UAS is based on a tricopter platform, and the total required thrust is shared between three motors. Note that the rear motor is primarily used for stabilization. Therefore, its contribution to thrust can be considered negligible for initial estimates. The power load is thus mainly shared between the front two motors of the UAS. From these power estimates, the load on each main motor will not exceed 250 watts during hovering operations. However, in order to keep motor temperatures low and have a considerable factor of safety, a larger main motor was selected. The selected main motors were rated at 700 W each providing a safety factor of □2.8. The rear motor is primarily responsible pitch control and therefore a smaller motor of 286 W was chosen.

In addition to sizing the motors, power estimates during hover operations are used to size the UAS flight battery. Typical maximum flight endurances of multirotors are between 10 and 15 minutes. The selected four-cell lithium-ion battery having a 8000 mAh capacity holds 118 watts of power, providing the UAS with a theoretical 14.2 minute hover time based on power consumption during hover. However, note that a lithium-ion battery can be safely discharged to only □75% of its capacity. Under this assumption, the expected hover time is reduced to just under 11 minutes.

The agricultural UAS is capable of VTOL and is also capable of horizontal flight. To achieve these capabilities, the UAS has a partial tilt-frame design, which is capable of transitioning from vertical flight to horizontal. However, the transition goes through only 45° whereas a true tilt-frame configuration goes through a pitch angle difference of 90°. Due to 45° maximum pitch during horizontal flight, the propellers are angled at 45° with respect to the incoming airflow. The propellers therefore share responsibility for generating lift with the wings of the aircraft during horizontal flight mode. It is difficult to estimate the optimal wing area because the contribution to total lifting force of the aircraft from generated thrust is largely unknown. The ideal wing area depends on a multitude of coupled variables, such as airspeed, angle of attack, weight, drag, and thrust from motors. Using the estimated UAS weight, the desired wing loading, and aspect ratio (AR), wing size is calculated. Because the aircraft is capable of VTOL, the wing loading will vary with respect to aircraft pitch. Due to the permanently 45°-rotated motors with respect to the wing, the tilt-frame UAS does not rely on wings as the single lift source in any flying configuration. This makes wing loading estimations difficult because the exact fraction of lift contribution from wings is unknown. To avoid making an underestimate, the wing loading is calculated as if only the wings are producing lift. Note that both wing loading and aspect ratio are critical to the performance of fixed wing aircraft because many performance metrics are dependent on these variables. Generally, a higher wing loading in fixed-wing aircraft increases take-off and landing airspeeds. In contrast, higher aspect ratio for wings increase wing efficiency but tend to decrease the vehicle's airspeed. However, because the tilt-frame UAS is VTOL-capable, concerns over landing and take-off airspeeds are not applicable. An efficient high aspect ratio wing is beneficial for endurance operations but because the agricultural UAS lands and powers down before executing its primary mission objective, range is more important than endurance. Note that a higher wing loading with a lower aspect ratio is desired for the agricultural UAS to increase its cruising speed in an attempt to increase the aircraft's overall range. In particular, the maximum desired wing loading for the tilt-frame UAS is between 18 and 23 kg/m$^2$, while the aspect ratio is set to 5 for a compromise between wing efficiency and airspeed.

The overall dimensions of the UAS were calculated using the parameters and assumptions discussed above, and the needed wing span is calculated using the wing loading and aspect ratio parameters. The motors (and associated PTGS hardware) were added to the tips of wings and increased the overall wingspan. However, the aerodynamically effective wingspan stayed constant because the added components do not contribute to wing lift. The fuselage length is set to a higher value, which increases the effective height of the VOC sensor above ground and thereby places it closer to the tree canopy while the UAS is landed on the ground.

The physical characteristics and performance parameters for an exemplary tilt-frame agricultural UAS are summarized in FIG. 5. Note that the weight break-down of all major components as they were installed onboard the agricultural UAS is shown in FIG. 5. Details behind the design, construction and implementation of these components are discussed below.

Exemplary Airframe Structure

Figure 1A:
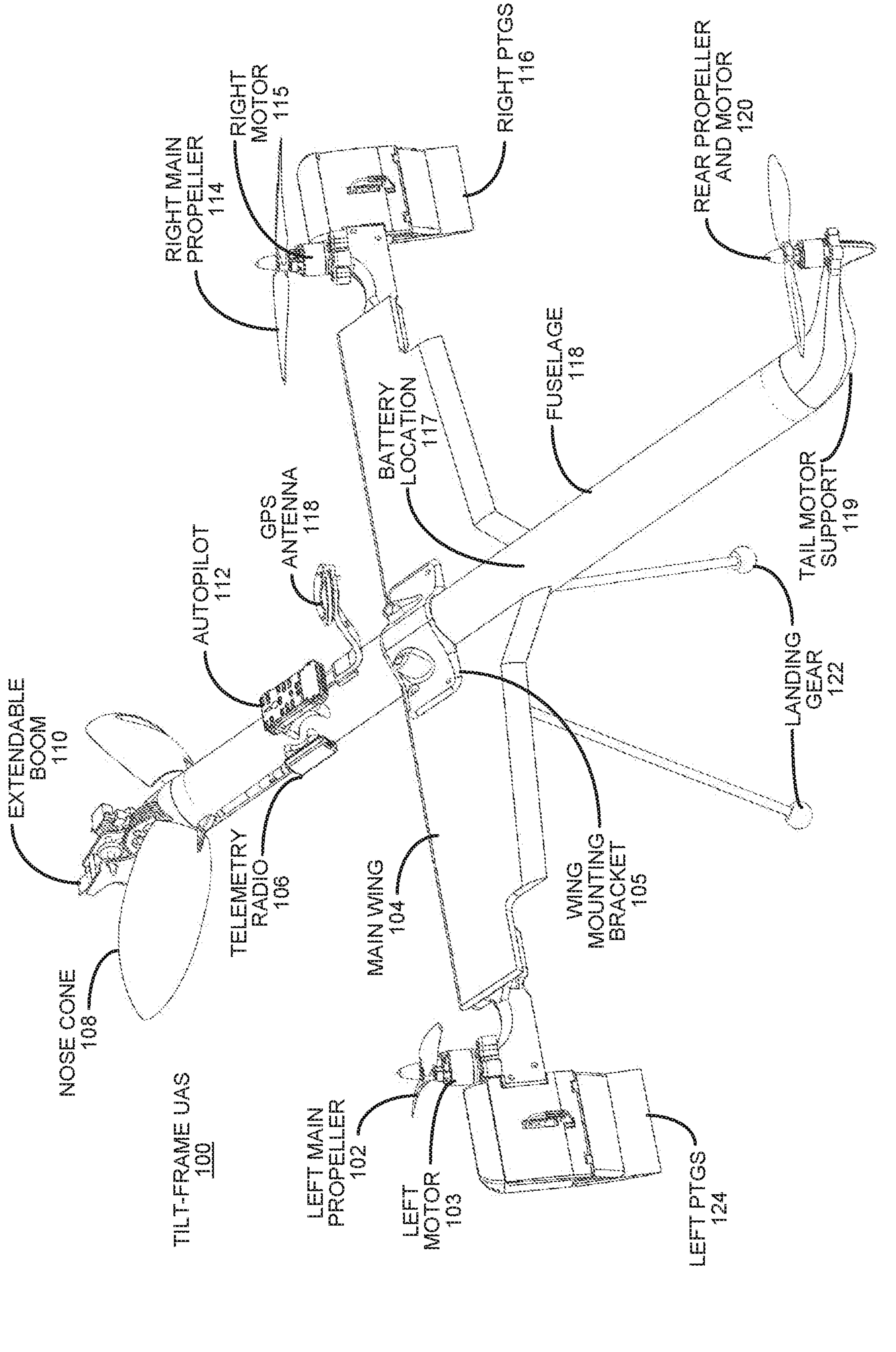
FIG. 1A presents a perspective view of a tilt-frame unmanned aerial system (UAS) in accordance with the disclosed embodiments.
Figure 1B:
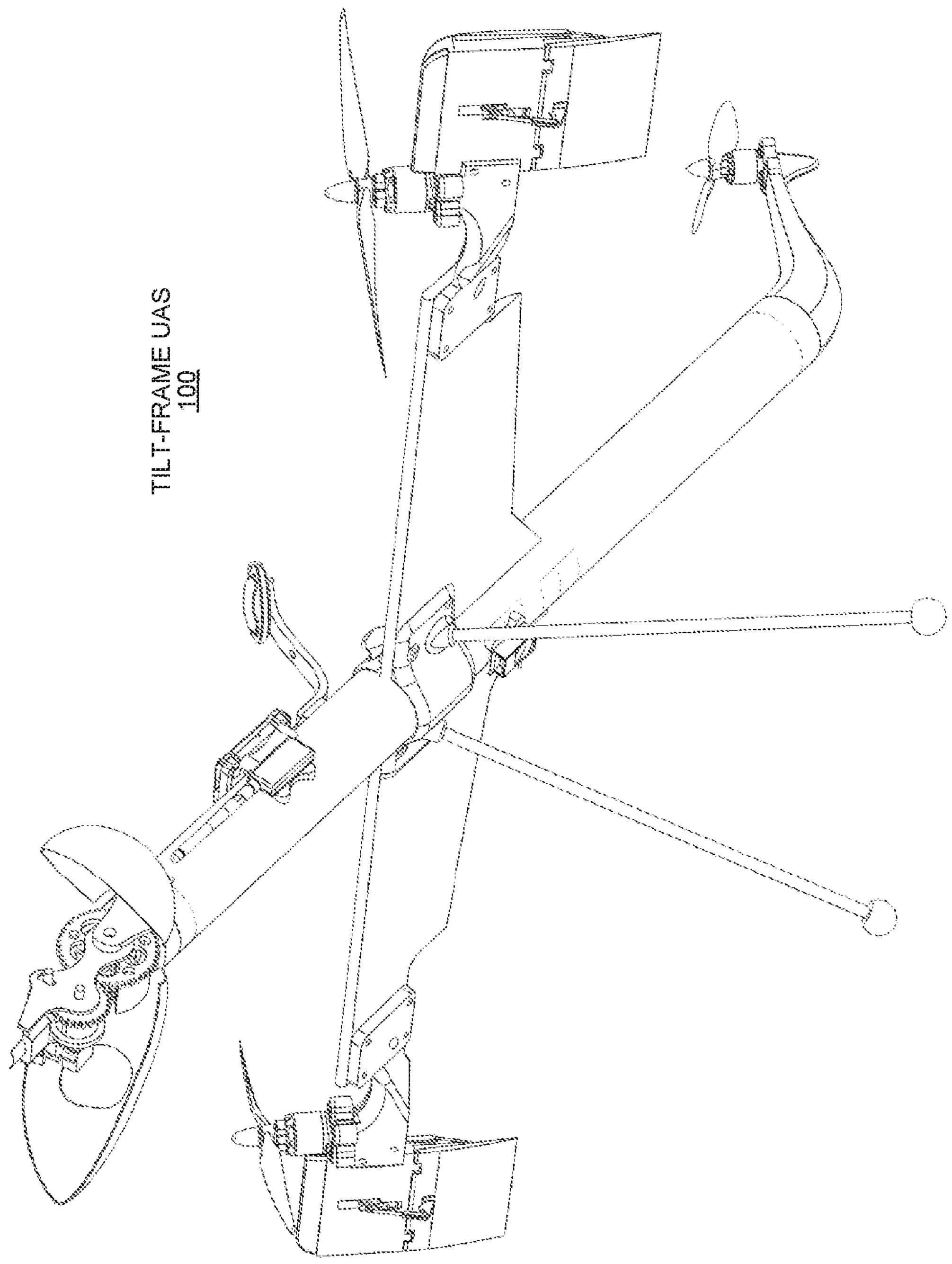
FIG. 1B presents another perspective view of the tilt-frame UAS in accordance with the disclosed embodiments.

FIG. 1A presents a perspective view of an exemplary tilt-frame unmanned aerial system (UAS) 100 in accordance with the disclosed embodiments. (FIG. 1B presents another perspective view of the tilt-frame UAS 100.) As with most aircraft, the structural material of the UAS is light and stiff. Additionally, the body and shape of the UAS is slender to decrease drag during the horizontal mode of operation. To decrease UAS frontal area, a narrow, 7.68 cm diameter cardboard tube is used as the fuselage 118. The tube is light yet rigid and is easily modified using relatively simple tools. The UAS main wing 104 was made from ⅜ inch thick balsa wood with the leading edge reinforced by ⅜ inch diameter carbon fiber tube. The main wing 104 is rigid, yet light, allowing for slight flexing.

As mentioned above, tilt-frame UAS 100 comprises a tri-rotor system, which includes three propellers, including: a left main propeller 102 coupled to a left motor 103 in proximity to a left PTGS 124; a right main propeller 114 coupled to a right motor 115 in proximity to a right PTGS 116; and a right propeller and motor 120 connected to a tail motor support 119.

The nose cone 108 and tail motor support 119 were 3D printed and inserted directly into the fuselage tube. (Note that nose cone 108 includes an extendable boom 110, which is used to deploy a VOC sampler in proximity to a tree canopy.) Both the nose cone 108 and tail motor 119 support are secured using four screws bolted through the fuselage. As Ultracote shrink-wrap film is used to cover the wings to reduce the surface roughness and protect the balsa wood from moisture. A special wing mounting bracket 105 was 3D printed to form a rigid connection between the fuselage and wings. This wing mounting bracket 105 holds landing gear 122 in place allowing the aircraft to maintain 45° wing pitch when resting on the ground.

Component Placement

The aircraft component placement strategy is to place the heaviest components as close to the center of gravity (CG) of the aircraft as possible. The CG of the agricultural UAS lies at ⅓ of the mean chord. As the largest contributor to the overall aircraft weight, the flight battery sits inside the fuselage at a location 117, which is □4 cm away from the CG. Note that the flight battery is inserted through the back of the fuselage and its position can be adjusted to achieve the desired CG based on the payload weight for a particular mission.

Major power distribution wiring was placed inside the fuselage to minimize drag and reduce the risk of snagging on external objects. The autopilot 112, which contains a magnetometer and an internal measurement unit (IMU), was placed on shock absorptive pads outside of the fuselage for easy interfacing and reducing electromagnetic interference with the power supply wires running along the inside of the fuselage. The telemetry radio 106, was placed as far from the autopilot 112 as possible to reduce interference. Also, the GPS antenna 118 was reoriented horizontal with respect to the ground instead of the fuselage to improve GPS accuracy during VTOL. The autopilot system 112 was placed as close to the CG as possible to avoid measuring erroneous motion from aircraft structure extremities. All loose wires were wrapped in plastic wiring sheaths to increase the level of organization and reduce drag during flight.

Propeller Thrust Governing System (PTGS)

Figure 2B:
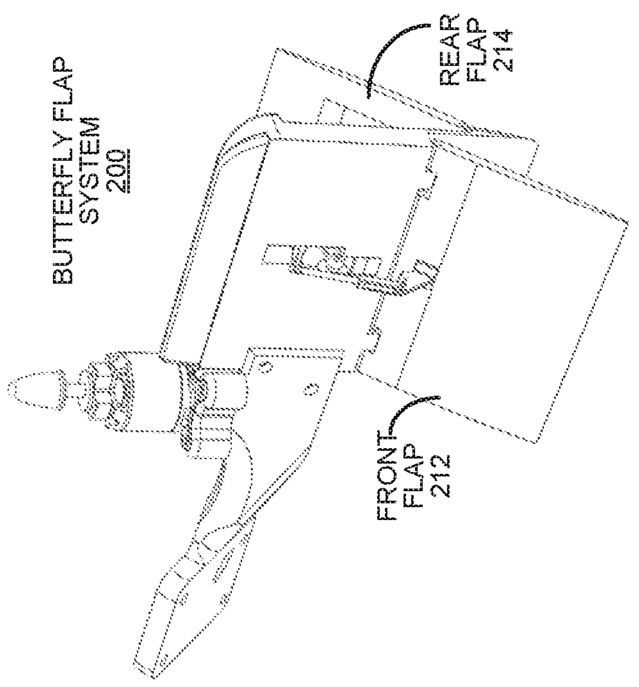
FIG. 2B presents another perspective view of the butterfly flap system in accordance with the disclosed embodiments.
Figure 2A:
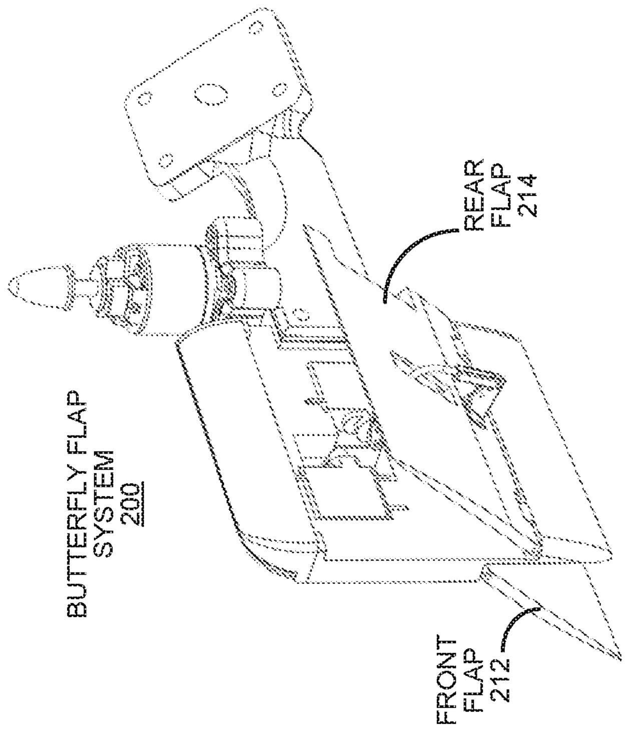
FIG. 2A presents a perspective view of a butterfly flap system in accordance with the disclosed embodiments.

As illustrated in FIG. 1A, tilt-frame UAS 100 is equipped with right and left PTGS modules 116 and 124 (also called "butterfly flaps".) These PTGS modules 116 and 124 enable tilt-frame UAS 100 to control roll and yaw without changing the rotational velocity of its main lifting motors. The system works by modulating the deflection angle of two flaps located directly below the propeller. For example, FIG. 2A illustrates a butterfly flap system 200 comprising a front flap 212 and a rear flap 214. Front flap 212 and rear flap 214 operate to reduce and redirect the airflow from the propeller to affect roll and yaw of the aircraft. FIG. 2B presents another perspective view of butterfly flap system 200.

Figure 2D:
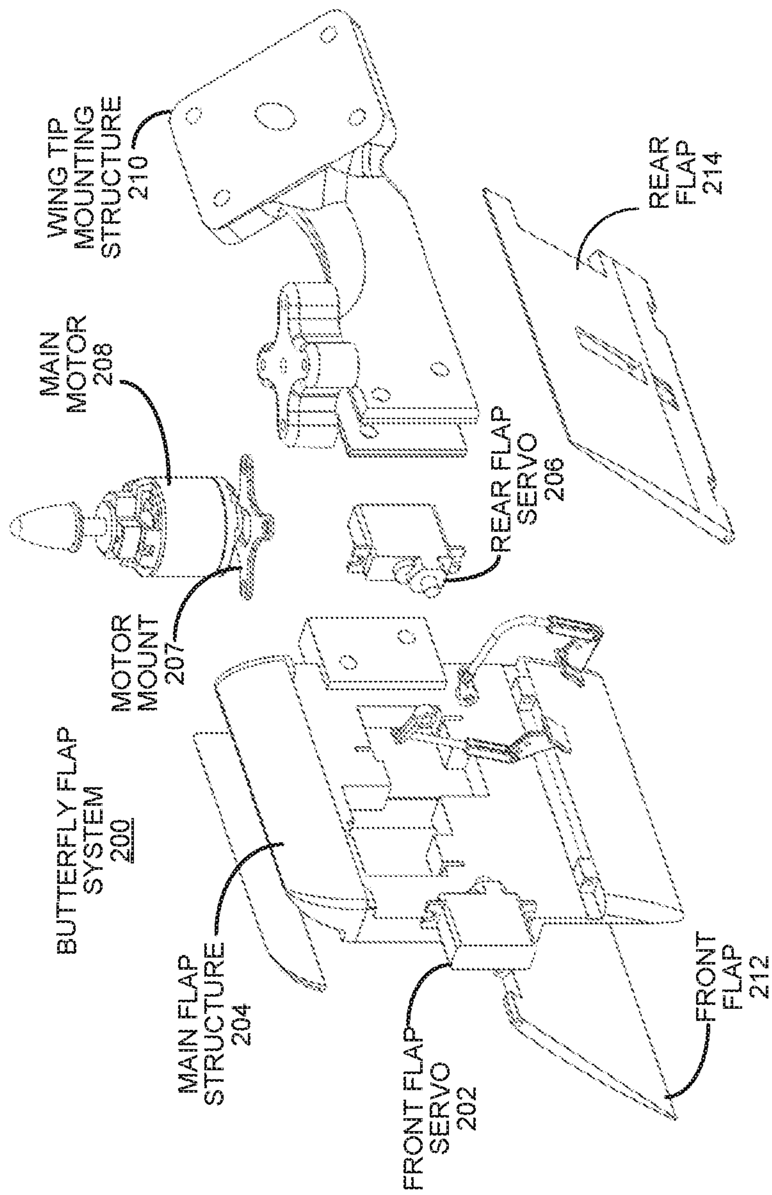
FIG. 2D presents an exploded view of the butterfly flap system in accordance with the disclosed embodiments.
Figure 2C:
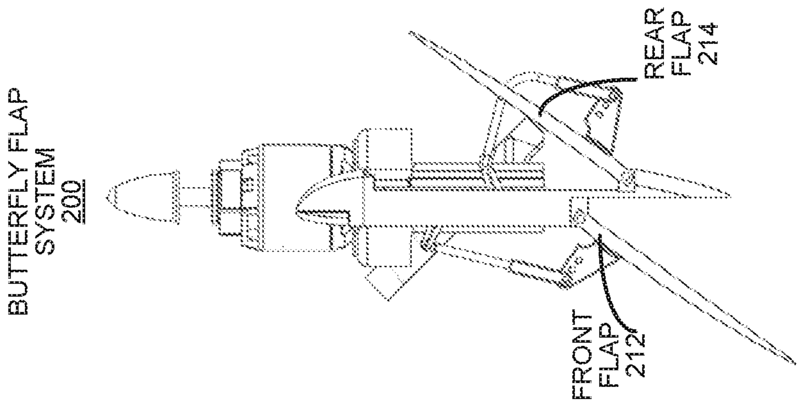
FIG. 2C presents a side view of the butterfly flap system in accordance with the disclosed embodiments.

FIG. 2C presents a side view of butterfly flap system 200. Note that the flaps are not symmetrical about the vertical axis as shown by FIG. 2C. However, the two sets of butterfly flaps (PTGS 116 and 124) are mirrored with respect to the fuselage on either side of the main wing 104.

FIG. 2D presents an exploded view of butterfly flap system 200 in accordance with the disclosed embodiments. Note that the flap mechanism for the PTGS includes a motor mount 207, which is attached to a main motor 208, and a wing tip mounting structure 210. Wing tip mounting structure 210 is also attached to a main flap structure 204, which is attached to front flap 212 and rear flap 214. Front flap 212 and rear flap 214 are controlled by front flap servo 202 and rear flap servo 206, respectively. The above-listed components are combined into a single system for wing tip attachment on UAS 100.

Butterfly fly flap system 200 was 3D printed in five separate pieces. Note that this 3D printing allows the system to be light and intricate in design. Additionally, all components are held together with nylon bolts such that upon component failure, the broken component is easily reprinted and replaced.

Process for Gathering VOC Samples

Figure 4:
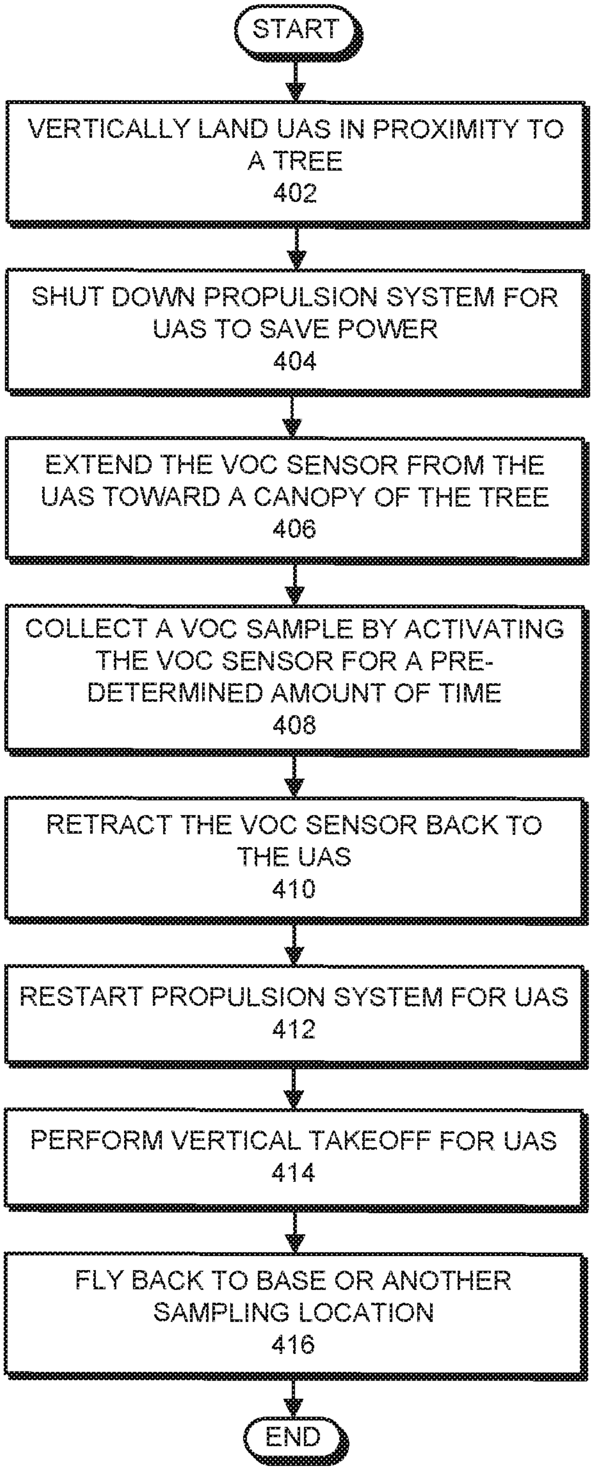
FIG. 4 presents a flow chart illustrating the process of gathering VOC samples from a tree in accordance with the disclosed embodiments.

FIG. 4 presents a flow chart illustrating the process of gathering volatile organic compound (VOC) samples from a tree in an orchard in accordance with the disclosed embodiments. During operation, the system vertically lands an unmanned aerial vehicle (UAS), which is capable of vertical take-off and landing (VTOL), in proximity to the tree in the orchard (step 402). Next, the system shuts down a propulsion system for the UAS to save power (step 404), and then extends a VOC sensor from the UAS toward a canopy of the tree (step 406). The system then collects a VOC sample by activating the VOC sensor for a predetermined amount of time (step 408). After the sampling is complete, the system retracts the VOC sensor back to the UAS (step 410) and restarts the propulsion system for the UAS (step 412). Finally, the system performs a vertical takeoff with the UAS (step 414), and flies the UAS back to a base or another sampling location (step 416).

Note that in additional to collecting VOCs for agricultural purposes, the disclosed embodiments can also be used for other applications, such as detecting leaks from remote gas lines.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An aircraft, which is capable of vertical takeoff and landing, comprising:
- a fuselage;
- a probe-deployment mechanism located at a front end of the fuselage, wherein:
  - the probe-deployment mechanism is configured to deploy a sample-gathering probe; and
  - when the aircraft is pitched up, the front end of the fuselage sits higher than a rear end of the fuselage to allow the probe-deployment mechanism to extend higher;
  - a main wing coupled to a middle section of the fuselage;
  - a right motor and associated right propeller coupled to a right side of the main wing;
  - a right propeller-thrust-governing system (PTGS) located in proximity to the right propeller;
  - a left motor and associated left propeller coupled to a left side of the main wing;
  - a left PTGS located in proximity to the left propeller; and
  - a pitch motor and associated pitch propeller located at the rear end of the fuselage, wherein the pitch propeller is angled to provide substantially vertical thrust to control a pitch of the fuselage;
  - wherein:
    - each PTGS comprises a pair of adjustable butterfly flaps located in an airflow of an associated propeller;
    - each pair of butterfly flaps includes a front flap and a rear flap; and
    - the front flap and rear flap open in opposing directions.

2. The aircraft of claim 1, wherein the probe-deployment mechanism includes an extendable boom, which extends the sample-gathering probe away from the aircraft.

3. The aircraft of claim 1, wherein the sample-gathering probe is configured to sample volatile organic compounds (VOCs).

4. The aircraft of claim 1, wherein the aircraft further comprises one or more landing supports, which support the aircraft after a vertical landing so that the front end of the fuselage sits higher than the rear end of the fuselage, which facilitates extending the sample-gathering probe above and away from the aircraft.

5. The aircraft of 4, wherein the one or more landing supports include the following three landing supports:
- a right leg extending from the middle section of the fuselage;
- a left leg extending from the middle section of the fuselage; and
- a tail support extending from the rear end of the fuselage.

6. The aircraft of claim 1, further comprising:
- wherein the right and left PTGSs are adjustable to reduce and/or redirect thrust from the associated right and left propellers.

7. The aircraft of claim 6, wherein by reducing and/or redirecting thrust from the left and right propellers, the left and right PTGSs control a roll-axis rotation and a yaw-axis rotation for the aircraft during horizontal flight.

8. The aircraft of claim 1, wherein: the left motor, the right motor and the pitch motor comprise a tri-motor system,
- the left and right motors generate thrust and control roll-axis and yaw-axis rotations for the aircraft, and
- the pitch motor controls a pitch-axis rotation for the aircraft.

9. The aircraft of claim 1, wherein the right and left propellers are fixedly attached to the main wing so that the angles of the right and left propellers cannot change with respect to the fuselage.

10. The aircraft of claim 1, wherein the pitch motor comprises a variable-speed motor.

11. The aircraft of claim 1, wherein the aircraft comprises an unmanned aerial vehicle (UAV).

12. The aircraft of claim 1, wherein:
- the front flap of each pair of butterfly flaps controls yaw motion of the aircraft; and
- the rear flap of each pair of butterfly flaps controls roll motion of the aircraft.

* * * * *